US012572522B2

(12) United States Patent
Brennan et al.

(10) Patent No.: US 12,572,522 B2
(45) Date of Patent: Mar. 10, 2026

(54) IDENTIFYING QUALITY OF LABELED DATA

(71) Applicant: GM Cruise Holdings LLC, San Francisco, CA (US)

(72) Inventors: Russell Brennan, Kirkland, WA (US); Boxin Li, Sammamish, WA (US); Wenjie Zhou, San Jose, CA (US)

(73) Assignee: GM Cruise Holdings LLC, San Francisco, CA (US)

( * ) Notice: Subject to any disclaimer, the term of this patent is extended or adjusted under 35 U.S.C. 154(b) by 41 days.

(21) Appl. No.: 18/189,962

(22) Filed: Mar. 24, 2023

(65) Prior Publication Data

US 2024/0320206 A1     Sep. 26, 2024

(51) Int. Cl.
G06F 16/22       (2019.01)
G06F 16/28       (2019.01)
G06N 20/00       (2019.01)

(52) U.S. Cl.
CPC ........ G06F 16/2272 (2019.01); G06F 16/285 (2019.01); G06N 20/00 (2019.01)

(58) Field of Classification Search
CPC .... G06F 16/2272; G06F 16/285; G06N 20/00
See application file for complete search history.

(56) References Cited

U.S. PATENT DOCUMENTS

| | | | | | |
|---|---|---|---|---|---|
| 6,298,351 | B1 * | 10/2001 | Castelli | ................. | G06V 20/13 |
| | | | | | 707/999.102 |
| 10,997,461 | B2 * | 5/2021 | Elluswamy | ............ | G16Y 20/10 |
| 11,308,364 | B1 * | 4/2022 | Herman | .............. | G06F 18/2178 |
| 11,379,718 | B2 * | 7/2022 | Desmond | ........... | G06F 18/2433 |
| 2008/0103996 | A1 * | 5/2008 | Forman | .................. | G06N 20/00 |
| | | | | | 706/12 |
| 2016/0371601 | A1 * | 12/2016 | Grove | .................... | G06N 20/00 |
| 2018/0373980 | A1 * | 12/2018 | Huval | .................... | G06F 18/41 |

(Continued)

FOREIGN PATENT DOCUMENTS

| | | | | | |
|---|---|---|---|---|---|
| CN | | 104166706 | A * | 11/2014 | .......... G06K 9/6268 |
| CN | | 110826494 | A * | 2/2020 | ........ G06K 9/00442 |

(Continued)

OTHER PUBLICATIONS

Kang, Daniel, et al. "Finding label and model errors in perception data with learned observation assertions." Proceedings of the 2022 international conference on management of data. 2022. (Year: 2022).*

(Continued)

*Primary Examiner* — Dennis Truong
(74) *Attorney, Agent, or Firm* — Honigman LLP; Matthew H. Szalach; Jonathan P. O'Brien

(57)          ABSTRACT

Aspects of the subject technology relate to systems, methods, and computer-readable media for identifying a quality of labeled data. Labeled data of a data set that exists at a specific granularity level can be accessed. The labeled data can be sampled on a lower granularity level relative to the specific granularity level of the data set to generate sampled data of the data set. The sampled data can be labeled to generate ground truth labeled data of the data set. The labeled data can be compared to the ground truth labeled data to identify a labeling quality metric of the labeled data. Relabeling of the data set can be performed based on the labeling quality metric.

20 Claims, 6 Drawing Sheets

PERCEPTION PROCESS 102

PREDICTION PROCESS 104

PLANNER PROCESS 106

MOTION PLANNER PROCESS 108

CONTROL PROCESS 110

(56)        References Cited

U.S. PATENT DOCUMENTS

| | | | | |
|---|---|---|---|---|
| 2019/0065989 A1* | 2/2019 | Kida | .................... | G06N 3/048 |
| 2019/0114546 A1* | 4/2019 | Anil | ...................... | G06N 3/084 |
| 2020/0012963 A1* | 1/2020 | Johnston | ............... | G06N 20/20 |
| 2020/0065712 A1* | 2/2020 | Wang | ..................... | G06N 20/20 |
| 2020/0151578 A1* | 5/2020 | Chen | ..................... | G06N 20/00 |
| 2020/0158516 A1* | 5/2020 | Gale | ...................... | G01C 21/32 |
| 2021/0089964 A1* | 3/2021 | Zhang | ................. | G06V 10/771 |
| 2021/0174196 A1* | 6/2021 | Desmond | ............ | G06F 18/2321 |
| 2021/0175553 A1* | 6/2021 | Van Tassell | .......... | G01N 29/46 |
| 2021/0241040 A1* | 8/2021 | Tong | .................. | G06F 18/2148 |
| 2021/0319333 A1* | 10/2021 | Lee | ........................... | G06N 3/08 |
| 2021/0350181 A1* | 11/2021 | Navratil | ................ | G06N 20/00 |
| 2021/0365793 A1* | 11/2021 | Surya | ..................... | G06N 3/045 |
| 2022/0036128 A1* | 2/2022 | Levanony | .............. | G06F 18/24 |
| 2022/0067588 A1* | 3/2022 | Büttner | ............... | G06V 10/774 |
| 2022/0076077 A1* | 3/2022 | Reddy | .................. | G06F 18/217 |
| 2022/0138561 A1* | 5/2022 | Prendki | ................... | G06N 3/08 |
| | | | | 706/12 |
| 2022/0300557 A1* | 9/2022 | Basu | ................. | G06F 16/9027 |
| 2022/0335311 A1* | 10/2022 | Lahlou | .................. | G06N 20/00 |
| 2023/0087292 A1* | 3/2023 | Wang | .................. | G06N 3/0464 |
| | | | | 382/159 |
| 2023/0244987 A1* | 8/2023 | Truong | ................. | G06N 20/00 |
| | | | | 706/11 |
| 2024/0054390 A1* | 2/2024 | Wendt | ................... | G06N 20/00 |
| 2024/0062051 A1* | 2/2024 | Baran Pouyan | ....... | G06N 20/20 |

FOREIGN PATENT DOCUMENTS

| | | | | | |
|---|---|---|---|---|---|
| CN | 114372532 A | * | 4/2022 | | |
| CN | 116635866 A | * | 8/2023 | ......... | G06F 18/2148 |
| EP | 4379606 A1 | * | 6/2024 | ............ | G06F 40/30 |
| WO | WO-2018224879 A1 | * | 12/2018 | ........... | B60W 30/00 |
| WO | WO-2023114514 A1 | * | 6/2023 | .......... | G06N 3/0464 |

OTHER PUBLICATIONS

"Identifying and Determining Trustworthiness of a MachineLearned Model" https://priorart.ip.com/IPCOM/000252359; Jan. 5, 2018 (Year: 2018).*

* cited by examiner

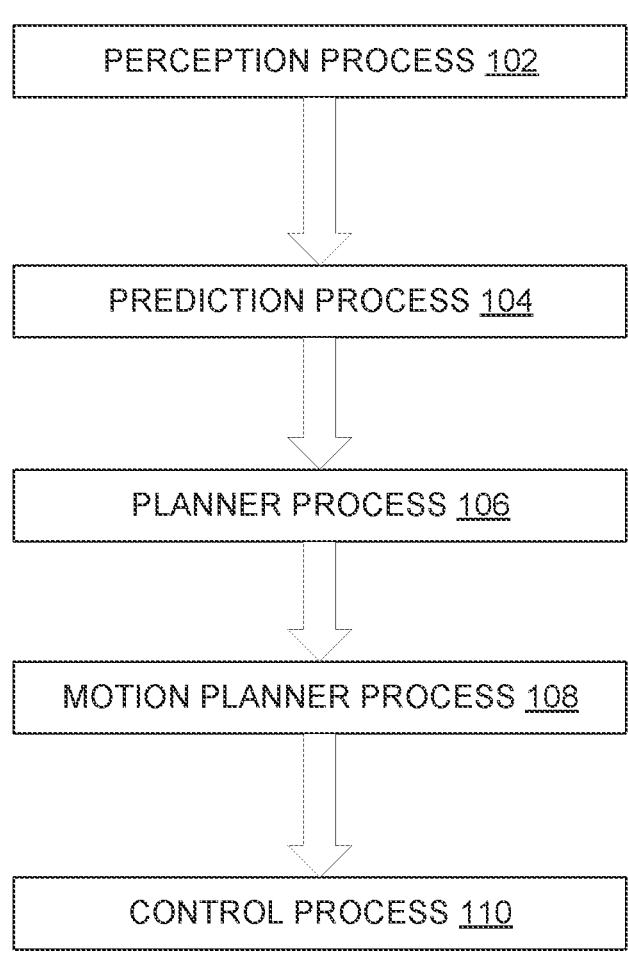
FIG. 1

200

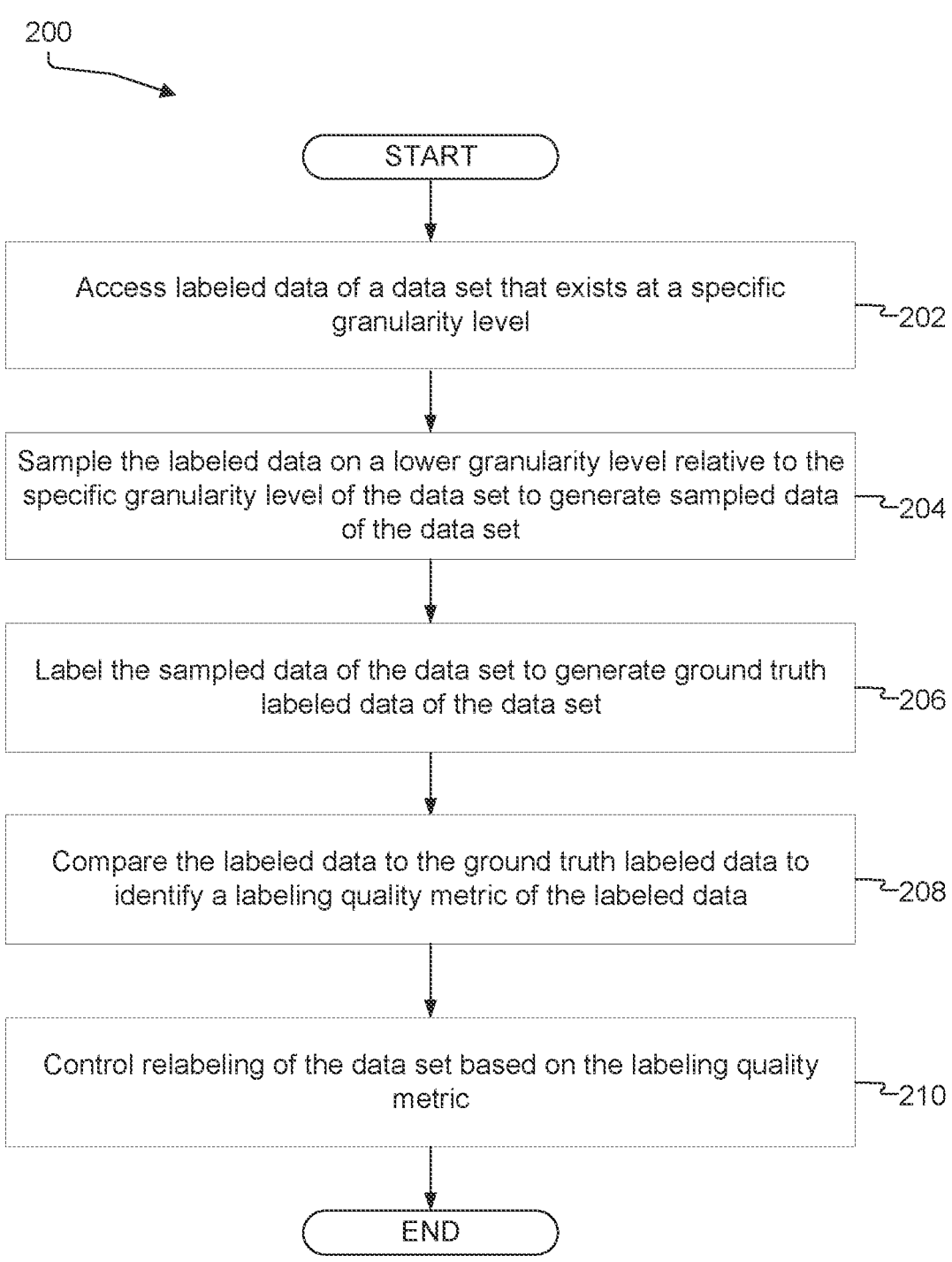

START

Access labeled data of a data set that exists at a specific granularity level ⌐∿202

Sample the labeled data on a lower granularity level relative to the specific granularity level of the data set to generate sampled data of the data set ⌐∿204

Label the sampled data of the data set to generate ground truth labeled data of the data set ⌐∿206

Compare the labeled data to the ground truth labeled data to identify a labeling quality metric of the labeled data ⌐∿208

Control relabeling of the data set based on the labeling quality metric ⌐∿210

END

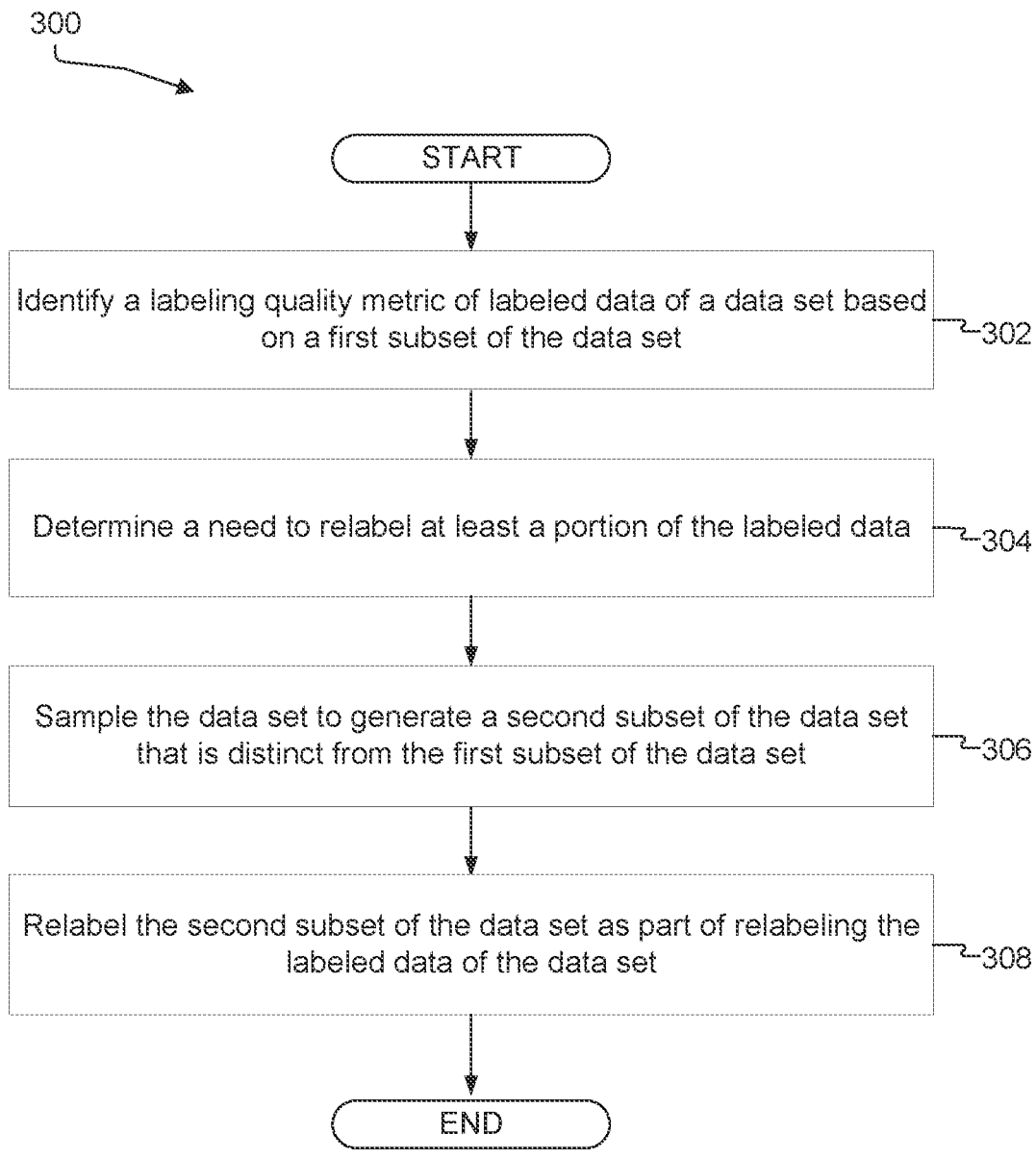

START

Identify a labeling quality metric of labeled data of a data set based
on a first subset of the data set — 302

Determine a need to relabel at least a portion of the labeled data — 304

Sample the data set to generate a second subset of the data set
that is distinct from the first subset of the data set — 306

Relabel the second subset of the data set as part of relabeling the
labeled data of the data set — 308

END

FIG. 3

IDENTIFYING QUALITY OF LABELED DATA

BACKGROUND

1. Technical Field

The present disclosure generally relates to identifying a quality of labeled data and, more specifically, to identifying a labeling quality at a lower granularity level relative to a data set and controlling relabeling of the data based on the identified labeling quality.

2. Introduction

An autonomous vehicle is a motorized vehicle that can navigate without a human driver. An exemplary autonomous vehicle can include various sensors, such as a camera sensor, a light detection and ranging (LIDAR) sensor, and a radio detection and ranging (RADAR) sensor, amongst others. The sensors collect data and measurements that the autonomous vehicle can use for operations such as navigation. The sensors can provide the data and measurements to an internal computing system of the autonomous vehicle, which can use the data and measurements to control a mechanical system of the autonomous vehicle, such as a vehicle propulsion system, a braking system, or a steering system. Typically, the sensors are mounted at fixed locations on the autonomous vehicles.

BRIEF DESCRIPTION OF THE DRAWINGS

The various advantages and features of the present technology will become apparent by reference to specific implementations illustrated in the appended drawings. A person of ordinary skill in the art will understand that these drawings only show some examples of the present technology and would not limit the scope of the present technology to these examples. Furthermore, the skilled artisan will appreciate the principles of the present technology as described and explained with additional specificity and detail through the use of the accompanying drawings in which:

FIG. 1 illustrates a conceptual flow of an example software stack that is run in association with the operation of an AV, according to some examples of the present disclosure;

FIG. 2 illustrates a flowchart for an example method of identifying a labeling quality metric of labeled data in a data set based on a varying granularity level relative to a granularity level of the data set, according to some examples of the present disclosure;

FIG. 3 illustrates a flowchart for an example method of relabeling labeled data based on a labeling quality metric that is identified for the labeled data, according to some examples of the present disclosure;

DETAILED DESCRIPTION

Figure 4:
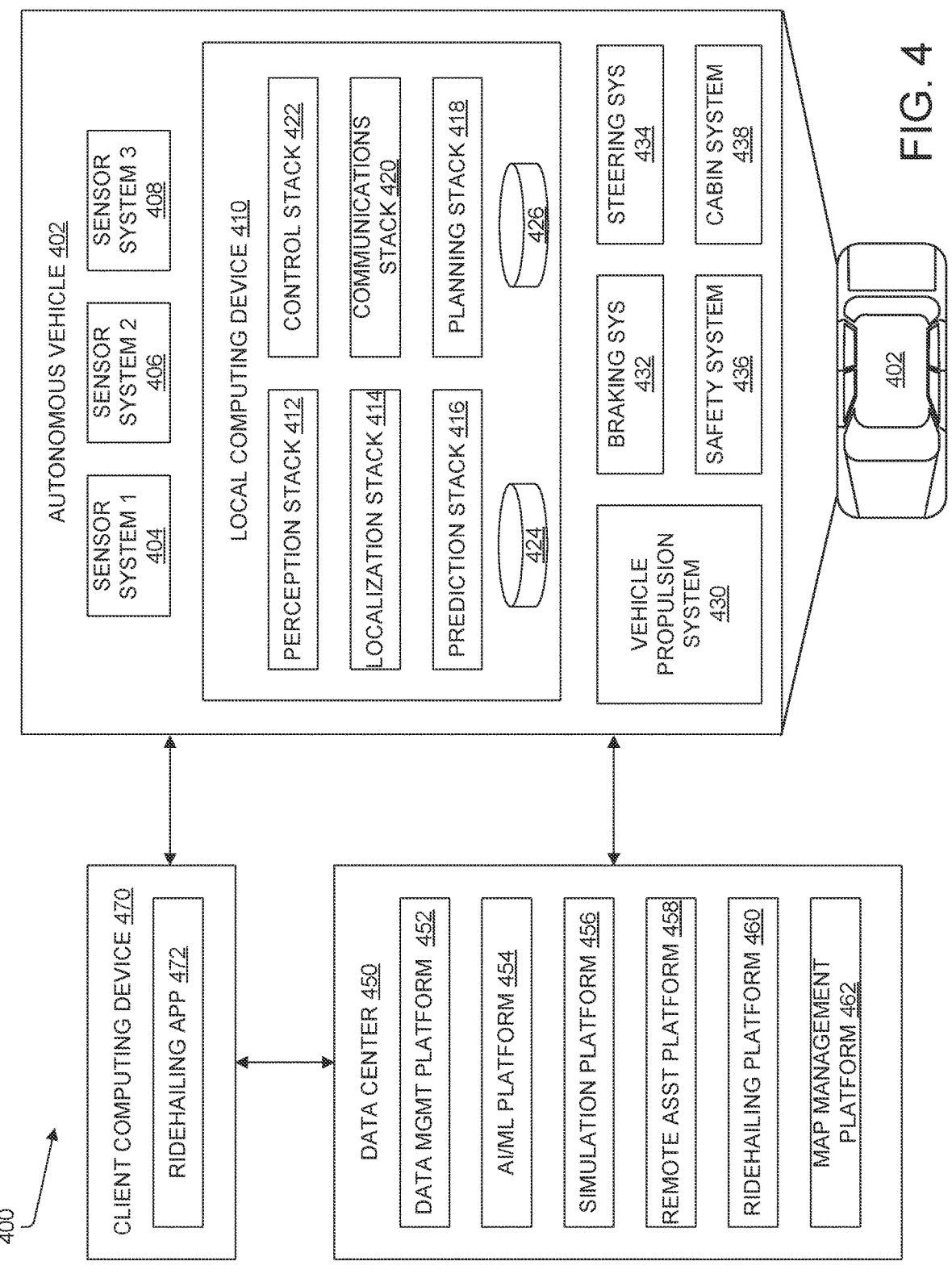
FIG. 4 illustrates an example system environment that can be used to facilitate autonomous vehicle (AV) dispatch and operations, according to some examples of the disclosed technology.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form to avoid obscuring the concepts of the subject technology.

Some aspect of the present technology may relate to the gathering and use of data available from various sources to improve safety, quality, and experience. The present disclosure contemplates that in some instances, this gathered data may include personal information. The present disclosure contemplates that the entities involved with such personal information respect and value privacy policies and practices.

Autonomous vehicles (AVs) can navigate roadways without a human driver based on sensor signals generated by multiple sensor systems, as described in more detail below. The sensor systems can include one or more types of sensors that can be arranged about the AV, including but not limited to camera sensors. In some examples, the AV can interpret sensor signals to detect and classify objects in the environment using a perception stack, as explained in more detail below. The perception stack can enable the AV to "see" (e.g., via cameras, LIDAR sensors, infrared sensors, etc.), "hear" (e.g., via microphones, ultrasonic sensors, RADAR, etc.), and "feel" (e.g., pressure sensors, force sensors, impact sensors, etc.) its environment using information from the sensor systems as well as other data sources. In some examples, the AV controller relies on the correct detection and classification of the objects in the AVs environment to subsequently provide commands for the actuators that control the AV's steering, throttle, brake, and drive unit. It is therefore crucial that the AV's perception stack can correctly detect and classify objects in the AV's environment so that the AV planner and controller can determine and implement a plan for controlling the AV in a safe and effective manner.

AVs can be controlled through software stacks that implement machine learning techniques to control the AVs based on sensor data that is captured during operation of the AVs. Specifically, software stacks can interpret gathered sensor data to perceive an environment and formulate a plan for controlling the AV based on perceived objects in the environment. In turn, the AV can be controlled according to this plan to facilitate operation of the AV in the environment.

Software stacks that implement machine learning techniques to control AVs can be trained through labeled data. While the technology is described herein with respect to AVs, it can be utilized in relevant applications related to labeled data. Labeled data includes a data set that has been tagged with one or more labels that relate to one or more characteristics of the data set. For example, labeled data can include an identification of pedestrians in environmental data gathered by an AV. Data can be labeled through an appropriate technique. For example, data can be manually labeled by human data annotators. Further, data can be labeled with the assistance of machines.

Labeling data consumes great amounts of resources, including both human resources and computational resources. Further, labeling data is time consuming. In particular, accurately labeling data is a costly process that is time consuming. However, it is important that data is labeled appropriately for various applications that use the labeled data, such as AV control. There is therefore a balance that can be implemented between labeled data accuracy and cost savings from a resource consumption standpoint in generating labeled data. In particular, quality assurance (herein referred to as "QA") reduction in data labeling can be attributed to a few interrelated factors including: difficulty in accurately quantifying, let alone guaranteeing, the quality of delivered labels; the need for high fidelity labeled data can lead to manual verification of label quality; and accurate measurement, reducing the time/cost of labels through QA reduction can be met with skepticism and sometimes push-back from customers. There therefore exist needs for systems and methods for quantifying labeled data accuracy in a cost-effective manner and relabeling the labeled data based on such quantification.

The disclosed technology addresses the problems associated with quantifying labeled data quality. Further, the disclosed technology addresses the problems associated with relabeling data in a cost-effective manner based on an identified quantification of labeled data quality. Specifically and as will be discussed in greater detail later, a labeling quality metric can be identified at a lower granularity level relative to a granularity level of a data set in order to reduce resource consumption used in quantifying the labeled data quality. Further, relabeling of the data set can be controlled based on the identified labeling quality metric to reduce resource consumption associated with relabeling data.

FIG. 1 illustrates a conceptual flow of an example software stack 100 that is run in association with the operation of an AV. The example AV software stack shown in FIG. 1 includes applicable processes that can be used in controlling an AV. Specifically, the example AV software stack shown in FIG. 1 includes a perception process 102, a prediction process 104, a planner process 106, a motion planner process 108, and a control process 110.

The perception process 102 functions to access sensor data gathered by an AV. The perception process 102 can fuse the sensor data. From the sensor data, the perception process 102 can track objects. Specifically, the perception process 102 can identify where tracked objects are in a field of view, e.g. relative to the AV.

The prediction process 104 functions to predict where objects will be in a field of view. Specifically, the prediction process 104 can predict the location of objects that are not tracked by the perception process 102. The prediction process 104 can predict the location of objects based on the tracked object output of the perception process 102.

The planner process 106 functions to identify a path for the AV. Specifically, the planner process 106 functions to identify a path for the AV based on either or both the output of the perception process 102 and the prediction process 104. In identifying a path for the AV, the planner process can weigh various moves by the AV against costs with respect to the output of either or both the perception process 102 and the prediction process 104.

The motion planner process 108 functions to identify a refined path for the AV. In particular, the motion planner process 108 functions to identify a refined path for the AV with respect to the path identified by the planner process 106. A refined path developed by the motion planner process 108 can include a path that is planned according to smaller time operations and smaller distances in comparison to the scheme that is used to develop the path by the planner process 106.

The control process 110 functions to communicate with control systems of the AV to implement the plan developed by either or both the planner process 106 and the motion planner process 108. Specifically, the control process 110 can communicate values of parameters for controlling the AV to applicable systems for controlling the AV. For example, the control process 110 can specify to an acceleration controller of the AV to accelerate at 10%.

The disclosure now continues with a discussion of identifying a labeling quality metric and controlling relabeling of data based on the labeling quality metric. Specifically, FIG. 2 illustrates a flowchart 200 for an example method of identifying a labeling quality metric of labeled data in a data set based on a varying granularity level relative to a granularity level of the data set. The method shown in FIG. 2 is provided by way of example, as there are a variety of ways to carry out the method. Additionally, while the example method is illustrated with a particular order of operations, those of ordinary skill in the art will appreciate that FIG. 2 and the modules shown therein can be executed in any order and can include fewer or more modules than illustrated. Each module shown in FIG. 2 represents one or more operations, processes, methods or routines in the method.

At operation 202, labeled data of a data set that exists at a specific granularity level is accessed. The data set can include applicable data for an applicable application. Specifically, the data can include data that is capable of being labeled for training a machine learning model. For example, the data set can include data that is captured by an AV for training a software stack, such as the software stack 100 shown in FIG. 1, that is related to operation of an AV.

The data set can be associated with one or more specific levels of granularity. Granularity of the data set can refer to a size in which the data set is organized or is otherwise dividable. Specifically, the data set can be associated with a granularity level of different sensors that generated the data set, data streams of each sensor, segments of data streams, one or more frames within a data stream, objects within frames of the data stream, and object attributes. For example, the data set can be associated with a capture granularity level that includes all data that is captured within a temporal time frame. Specifically, the data set can be associated with a capture granularity level that includes all data that is captured by the various sensors of an AV during a trip. With respect to object attributes, for pink rabbit as an object, it has a classification attribute of a rabbit and a color attribute of pink.

At operation 204, the labeled data is sampled on a lower granularity level relative to the specific granularity level of the data set to generate sampled data of the data set. Specifically, the labeled data can be sampled at a lower granularity level relative to a capture level of granularity of the data set. For example, the labeled data can be sampled at an object level of granularity by sampling objects in the data set. In another example, the labeled data can be sampled at a frame level of granularity by sampling frames in the data set. By sampling at a frame level, scene audits can be effectively performed to check for missing objects in the frames.

An applicable sampling technique can be applied to sample the labeled data at a lower granularity level relative to the specific granularity level of the data set. Specifically, sampling can be performed, e.g. at a specific level, to obtain a sampled data set that is representative of the overall dataset. For example, sampling can be performed randomly or pseudo-randomly across the data set. In particular, sampling can be as small as possible but large enough to be statistically significant, potentially including for long-tail objects. For example, sampling of 0.1% of an overall data set can be sufficient for a statistically significant quality score. For example, in performing object level sampling, a population size, e.g. the number of objects in a typical campaign, can be 72,000. The resultant sample size for achieving a statistically significant sampled data set can be 3240 objects, e.g. ~ 4.5% sample rate. In an example, in performing an object/frame level sampling a population size can be 4,500,000. The resultant sample size for achieving a statistically significant sampled data set can be 3400 object-labels, e.g. ~ 0.07% sample rate.

At operation 206, the sampled data of the data set is labeled to generate ground truth labeled data of the data set. The sampled data can be labeled using an applicable technique. Specifically, a model can be applied to generate a bulk inference of the sampled data and apply the inference to the sampled data to reduce time and costs associated with labeling. More specifically, model-generated pre-labels can be applied to reduce labeler time and cost. A labeling pass, e.g. zero-margin or other less strict tolerance margin, can be performed on a random sample of the labeled data.

The sampled data can be labeled with labels that have been defined to have a 0% or nearly 0% tolerance margin. This can help in ensuring that the labels applied to the sampled data are accurate and that the labeled sampled data is truly ground truth labeled data. Specifically, zero-margin labels can be applied to the sampled data and considered 100% accurate for the purpose of use as a ground truth dataset. The labeled sampled data can be verified by a human, e.g. by a machine learning engineer (herein "MLE").

In sampling the labeled data at a lower granularity level, e.g. relative to a capture level of granularity of the data set, and labeling that data to generate ground truth labeled data, time and computational resources can be conserved. Specifically, only a portion of the data set needs to be sampled to generate a statistically significant sample that can serve as ground truth data. In particular, at lower granularity levels relative to a highest level of granularity, e.g. capture level of granularity, the larger amount of data is available for sampling. As the amount of data for sampling increases, the sample size can be decreased while still maintaining a specific statistical confidence in the sampled results. In turn, the data of the smaller sample can be labeled at a decreased cost and at a reduced time relative to labeling data in a larger sample. As a result, actual ground truth data can be created that accurately reflects all of the labeled data at a decreased cost and time expense.

At operation 208, the labeled data is compared to the ground truth labeled data to identify a labeling quality metric of the labeled data. A labeling quality metric can include an applicable metric for quantifying quality of labeled data. For example, a labeling quality metric can account for accuracy in the labeling of data. Specifically, a labeling quality metric can reflect an f score. In another example, a labeling quality metric can be defined based on recall.

Specific labels in the ground truth labeled data can be compared to corresponding labels in the labeled data to determine an amount of the labeled data that is correctly or incorrectly labeled. As follows, a labeling quality metric can be defined for the labeled data based on either or both the amount of correctly labeled data and the amount of incorrectly labeled data in the labeled data. The labeling quality metric can be defined agnostically as to an application for which the labeled data will be applied. For example, the labeling quality metric can be defined agnostically as to whether the labeled data will be used to train a machine learning model for recognizing pedestrians or train a machine learning model for controlling steering in an AV.

The labeling quality metric can be defined relative to error tolerance thresholds. Such error tolerance thresholds can be defined by a human, e.g. an MLE, and specify an error tolerance that is acceptable. In defining the labeling quality metric relative to error tolerance thresholds, the labeling quality metric can be defined as shown below in Equation 1.

$$\text{Labeled Data Quality Score} = \frac{\text{number of labels within error tolerance}}{\text{total number of checked labels}} \qquad \text{Equation 1}$$

The labeling quality metric can be defined based on a specific application of the labeled data of the data set to one or more models. Specifically, the labeling quality metric can be defined based on how incorrectly labeled data impacts an application for the labeled data. For example, if a machine learning model that will be trained with labeled data is sensitive to the quality of the labeled data, then the labeling quality metric can be defined to have a very low error tolerance threshold.

The labeling quality metric can be defined on a per-label basis or another applicable granularity basis of the data set. Specifically, the labeling quality metric can be defined on an overall quality of the data set basis, e.g. the capture level of granularity. Such per-label basis or other applicable granularity basis for defining the labeling quality metric can be defined with respect to one or more thresholds. For example, requirements for data labeling quality can specify that the overall data set quality meets a certain threshold. In another example, requirements for data labeling quality can specify that the quality meets a certain threshold on a per-label basis.

At operation 210, relabeling of the data set is controlled based on the labeling quality metric. In controlling relabeling of the data set, all or a portion of the labeled data set can be relabeled based on the labeling quality metric. More specifically and as will be discussed in greater detail later, certain portions of the labeled data that should be relabeled can be selected based on the quality metric. The process of relabeling the data set can be repeated an applicable number of times until a desired labeling quality metric is achieved. Relabeling of the data set can be controlled based on the labeling quality metric in relation to one or more thresholds. For example, if there is a large difference between the labeling quality metric and an error threshold, then a large amount of the data set can be relabeled in comparison to the scenario where a smaller difference exists between the labeling quality metric and the error threshold.

The technology described herein can facilitate the creation of multiple quality metrics. The metrica can be computed on arbitrary "slices" of the dataset in order to facilitate expression of different requirements of the resulting data. For example, labels with 90% accuracy overall, pink rabbits having a recall of 95% can be enabled by computing accuracy on the whole dataset, and recall on pink rabbits. And because there are presumably far fewer pink rabbits, the sample rate would be higher for that slice in order to achieve the same desired confidence level.

The disclosure now continues with a discussion of controlling relabeling of data based on an identified labeling quality metric. Specifically, FIG. 3 illustrates a flowchart 300 for an example method of relabeling labeled data based on a labeling quality metric that is identified for the labeled data. The method shown in FIG. 3 is provided by way of example, as there are a variety of ways to carry out the method. Additionally, while the example method is illustrated with a particular order of operations, those of ordinary skill in the art will appreciate that FIG. 3 and the modules shown therein can be executed in any order and can include fewer or more modules than illustrated. Each module shown in FIG. 3 represents one or more operations, processes, methods or routines in the method.

At operation 302, a labeling quality metric of labeled data of a data set is identified based on a first subset of the data set. The labeling quality metric can be identified using an applicable technique, such as the technology described herein. Specifically, a first subset of the data set can be sampled and labeled as ground truth data. In turn, the labeling quality metric of the labeled data can be identified by comparing the labeled data to the ground truth data.

At operation 304, a need to relabel at least a portion of the labeled data is determined. The need to relabel at least a portion of the labeled data can be determined based on the labeling quality metric of the labeled data. For example, a need to relabel at least a portion of the labeled data can be determined based on the labeling quality metric in relation to one or more thresholds.

At operation 306, the data set is sampled to generate a second subset of the data set that is independent from the first subset of the data set. Specifically, the second subset of the data can be generated by sampling the data set in an operation that is independent from an operation that is used to generate the first subset of the data set. The second subset of the data can be generated using one or more applicable techniques. Specifically, one or more applicable techniques can be applied to select an amount of the data set to sample to generate the second subset of the data set. Further, one or more applicable techniques can be applied to select specific data of the data set to include in the second subset of the data set. For example, one or more applicable techniques can be applied to select specific data based on a likelihood that the specific data has been labeled incorrectly.

A random or pseudo-random sampling approach can be applied to sample the data set and generate the second subset of labeled data. In various embodiments, the data set can be sampled based on the difference between the labeling quality metric and a desired quality. For example, using the random or pseudo-random approach, to get from N % accuracy to 98% accuracy, the data set can be sampled ((98-N)/(100-N))% of the dataset.

The data set can be sampled using a complex heuristic approach to generate the second subset of the data set. Specifically, using applicable inputs such as labeler tenure, historical labeler accuracy, types of errors detected in quality assurance, and disagreement with pre-labeling output, a complex heuristic approach can be applied to generate the second subset of the data set. By sampling through a complex heuristic approach, less of the data set needs to be sampled in order to bring the overall dataset up to applicable, or otherwise acceptable, quality standards, e.g. as much as a 2% reduction in sampling is needed in comparison to random or pseudo random sampling.

The data set can also be sampled using an applicable machine learning technique. Specifically, a machine learning technique can apply a trained machine learning model to applicable inputs, such as labeler tenure, historical labeler accuracy, types of errors detected in quality assurance, and disagreement with pre-labeling output to generate the second subset of the data set. A machine learning model that is applied to identify the second subset of data can be trained to predict labels outside of a tolerance. By sampling through a machine learning approach, less of the data set needs to be sampled in order to bring the overall dataset up to applicable quality standards, e.g. as much as a 2% reduction in sampling is needed in comparison to the complex heuristic approach.

At operation 308, the second subset of the data set is relabeled as part of relabeling the labeled data of the data set. Specifically, the second subset of the data set can be relabeled to create refined labeled data. The refined labeled data can then be compared to ground truth labeled data to identify a labeling quality metric of the refined labeled data through one or more applicable processes, e.g. such as the technique shown in FIG. 2. As follows, further relabeling of the data set can be controlled based on the labeling quality metric of the refined labeled data. Specifically, portions of the refined labeled data can be relabeled based on the labeling quality metric, e.g. if the labeling quality metric does not meet a specific threshold. This process can be repeated until a desired labeling quality metric is achieved.

The disclosure now turns to a discussion of an AV environment. Specifically, FIG. 4 is a diagram illustrating an example AV environment 400, according to some examples of the present disclosure. One of ordinary skill in the art will understand that, for AV environment 400 and any system discussed in the present disclosure, there can be additional or fewer components in similar or alternative configurations. The illustrations and examples provided in the present disclosure are for conciseness and clarity. Other examples may include different numbers and/or types of elements, but one of ordinary skill the art will appreciate that such variations do not depart from the scope of the present disclosure.

In this example, the AV environment 400 includes an AV 402, a data center 450, and a client computing device 470. The AV 402, the data center 450, and the client computing device 470 can communicate with one another over one or more networks (not shown), such as a public network (e.g., the Internet, an Infrastructure as a Service (IaaS) network, a Platform as a Service (PaaS) network, a Software as a Service (SaaS) network, other Cloud Service Provider (CSP) network, etc.), a private network (e.g., a Local Area Network (LAN), a private cloud, a Virtual Private Network (VPN), etc.), and/or a hybrid network (e.g., a multi-cloud or hybrid cloud network, etc.).

The AV 402 can navigate roadways without a human driver based on sensor signals generated by multiple sensor systems 404, 406, and 408. The sensor systems 404-408 can include one or more types of sensors and can be arranged about the AV 402. For instance, the sensor systems 404-408 can include Inertial Measurement Units (IMUs), cameras (e.g., still image cameras, video cameras, etc.), light sensors (e.g., LIDAR systems, ambient light sensors, infrared sensors, etc.), RADAR systems, GPS receivers, audio sensors (e.g., microphones, Sound Navigation and Ranging (SONAR) systems, ultrasonic sensors, etc.), engine sensors, speedometers, tachometers, odometers, altimeters, tilt sensors, impact sensors, airbag sensors, seat occupancy sensors, open/closed door sensors, tire pressure sensors, rain sensors, and so forth. For example, the sensor system 404 can be a camera system, the sensor system 406 can be a LIDAR system, and the sensor system 408 can be a RADAR system. Other examples may include any other number and type of sensors.

The AV 402 can also include several mechanical systems that can be used to maneuver or operate the AV 402. For instance, the mechanical systems can include a vehicle propulsion system 430, a braking system 432, a steering system 434, a safety system 436, and a cabin system 438, among other systems. The vehicle propulsion system 430 can include an electric motor, an internal combustion engine, or both. The braking system 432 can include an engine brake, brake pads, actuators, and/or any other suitable componentry configured to assist in decelerating the AV 402. The steering system 434 can include suitable componentry configured to control the direction of movement of the AV 402 during navigation. The safety system 436 can include lights and signal indicators, a parking brake, airbags, and so forth. The cabin system 438 can include cabin temperature control systems, in-cabin entertainment systems, and so forth. In some examples, the AV 402 might not include human driver actuators (e.g., steering wheel, handbrake, foot brake pedal, foot accelerator pedal, turn signal lever, window wipers, etc.) for controlling the AV 402. Instead, the cabin system 438 can include one or more client interfaces (e.g., Graphical User Interfaces (GUIs), Voice User Interfaces (VUIs), etc.) for controlling certain aspects of the mechanical systems 430-438.

The AV 402 can include a local computing device 410 that is in communication with the sensor systems 404-408, the mechanical systems 430-438, the data center 450, and the client computing device 470, among other systems. The local computing device 410 can include one or more processors and memory, including instructions that can be executed by the one or more processors. The instructions can make up one or more software stacks or components responsible for controlling the AV 402; communicating with the data center 450, the client computing device 470, and other systems; receiving inputs from riders, passengers, and other entities within the AV's environment; logging metrics collected by the sensor systems 404-408; and so forth. In this example, the local computing device 410 includes a perception stack 412, a localization stack 414, a prediction stack 416, a planning stack 418, a communications stack 420, a control stack 422, an AV operational database 424, and an HD geospatial database 426, among other stacks and systems.

Perception stack 412 can enable the AV 402 to "see" (e.g., via cameras, LIDAR sensors, infrared sensors, etc.), "hear" (e.g., via microphones, ultrasonic sensors, RADAR, etc.), and "feel" (e.g., pressure sensors, force sensors, impact sensors, etc.) its environment using information from the sensor systems 404-408, the localization stack 414, the HD geospatial database 426, other components of the AV, and other data sources (e.g., the data center 450, the client computing device 470, third party data sources, etc.). The perception stack 412 can detect and classify objects and determine their current locations, speeds, directions, and the like. In addition, the perception stack 412 can determine the free space around the AV 402 (e.g., to maintain a safe distance from other objects, change lanes, park the AV, etc.). The perception stack 412 can identify environmental uncertainties, such as where to look for moving objects, flag areas that may be obscured or blocked from view, and so forth. In some examples, an output of the perception stack 412 can be a bounding area around a perceived object that can be associated with a semantic label that identifies the type of object that is within the bounding area, the kinematic of the object (information about its movement), a tracked path of the object, and a description of the pose of the object (its orientation or heading, etc.).

Localization stack 414 can determine the AV's position and orientation (pose) using different methods from multiple systems (e.g., GPS, IMUs, cameras, LIDAR, RADAR, ultrasonic sensors, the HD geospatial database 426, etc.). For example, in some cases, the AV 402 can compare sensor data captured in real-time by the sensor systems 404-408 to data in the HD geospatial database 426 to determine its precise (e.g., accurate to the order of a few centimeters or less) position and orientation. The AV 402 can focus its search based on sensor data from one or more first sensor systems (e.g., GPS) by matching sensor data from one or more second sensor systems (e.g., LIDAR). If the mapping and localization information from one system is unavailable, the AV 402 can use mapping and localization information from a redundant system and/or from remote data sources.

Prediction stack 416 can receive information from the localization stack 414 and objects identified by the perception stack 412 and predict a future path for the objects. In some examples, the prediction stack 416 can output several likely paths that an object is predicted to take along with a probability associated with each path. For each predicted path, the prediction stack 416 can also output a range of points along the path corresponding to a predicted location of the object along the path at future time intervals along with an expected error value for each of the points that indicates a probabilistic deviation from that point.

Planning stack 418 can determine how to maneuver or operate the AV 402 safely and efficiently in its environment. For example, the planning stack 418 can receive the location, speed, and direction of the AV 402, geospatial data, data regarding objects sharing the road with the AV 402 (e.g., pedestrians, bicycles, vehicles, ambulances, buses, cable cars, trains, traffic lights, lanes, road markings, etc.) or certain events occurring during a trip (e.g., emergency vehicle blaring a siren, intersections, occluded areas, street closures for construction or street repairs, double-parked cars, etc.), traffic rules and other safety standards or practices for the road, user input, and other relevant data for directing the AV 402 from one point to another and outputs from the perception stack 412, localization stack 414, and prediction stack 416. The planning stack 418 can determine multiple sets of one or more mechanical operations that the AV 402 can perform (e.g., go straight at a specified rate of acceleration, including maintaining the same speed or decelerating; turn on the left blinker, decelerate if the AV is above a threshold range for turning, and turn left; turn on the right blinker, accelerate if the AV is stopped or below the threshold range for turning, and turn right; decelerate until completely stopped and reverse; etc.), and select the best one to meet changing road conditions and events. If something unexpected happens, the planning stack 418 can select from multiple backup plans to carry out. For example, while preparing to change lanes to turn right at an intersection, another vehicle may aggressively cut into the destination lane, making the lane change unsafe. The planning stack 418 could have already determined an alternative plan for such an event. Upon its occurrence, it could help direct the AV 402 to go around the block instead of blocking a current lane while waiting for an opening to change lanes.

Control stack 422 can manage the operation of the vehicle propulsion system 430, the braking system 432, the steering system 434, the safety system 436, and the cabin system 438. The control stack 422 can receive sensor signals from the sensor systems 404-408 as well as communicate with other stacks or components of the local computing device 410 or a remote system (e.g., the data center 450) to effectuate operation of the AV 402. For example, the control stack 422 can implement the final path or actions from the multiple paths or actions provided by the planning stack 418. This can involve turning the routes and decisions from the planning stack 418 into commands for the actuators that control the AV's steering, throttle, brake, and drive unit.

Communications stack 420 can transmit and receive signals between the various stacks and other components of the AV 402 and between the AV 402, the data center 450, the client computing device 470, and other remote systems. The communications stack 420 can enable the local computing device 410 to exchange information remotely over a network, such as through an antenna array or interface that can provide a metropolitan WIFI network connection, a mobile or cellular network connection (e.g., Third Generation (3G), Fourth Generation (4G), Long-Term Evolution (LTE), 5th Generation (5G), etc.), and/or other wireless network connection (e.g., License Assisted Access (LAA), Citizens Broadband Radio Service (CBRS), MULTEFIRE, etc.). Communications stack 420 can also facilitate the local exchange of information, such as through a wired connection (e.g., a user's mobile computing device docked in an in-car docking station or connected via Universal Serial Bus (USB), etc.) or a local wireless connection (e.g., Wireless Local Area Network (WLAN), Low Power Wide Area Network (LPWAN), Bluetooth®, infrared, etc.).

The HD geospatial database 426 can store HD maps and related data of the streets upon which the AV 402 travels. In some examples, the HD maps and related data can comprise multiple layers, such as an areas layer, a lanes and boundaries layer, an intersections layer, a traffic controls layer, and so forth. The areas layer can include geospatial information indicating geographic areas that are drivable (e.g., roads, parking areas, shoulders, etc.) or not drivable (e.g., medians, sidewalks, buildings, etc.), drivable areas that constitute links or connections (e.g., drivable areas that form the same road) versus intersections (e.g., drivable areas where two or more roads intersect), and so on. The lanes and boundaries layer can include geospatial information of road lanes (e.g., lane centerline, lane boundaries, type of lane boundaries, etc.) and related attributes (e.g., direction of travel, speed limit, lane type, etc.). The lanes and boundaries layer can also include three-dimensional (3D) attributes related to lanes (e.g., slope, elevation, curvature, etc.). The intersections layer can include geospatial information of intersections (e.g., crosswalks, stop lines, turning lane centerlines and/or boundaries, etc.) and related attributes (e.g., permissive, protected/permissive, or protected only left turn lanes; legal or illegal u-turn lanes; permissive or protected only right turn lanes; etc.). The traffic controls lane can include geospatial information of traffic signal lights, traffic signs, and other road objects and related attributes.

AV operational database 424 can store raw AV data generated by the sensor systems 404-408, stacks 412-422, and other components of the AV 402 and/or data received by the AV 402 from remote systems (e.g., the data center 450, the client computing device 470, etc.). In some examples, the raw AV data can include HD LIDAR point cloud data, image data, RADAR data, GPS data, and other sensor data that the data center 450 can use for creating or updating AV geospatial data or for creating simulations of situations encountered by AV 402 for future testing or training of various machine learning algorithms that are incorporated in the local computing device 410.

Data center 450 can include a private cloud (e.g., an enterprise network, a co-location provider network, etc.), a public cloud (e.g., an Infrastructure as a Service (IaaS) network, a Platform as a Service (PaaS) network, a Software as a Service (SaaS) network, or other Cloud Service Provider (CSP) network), a hybrid cloud, a multi-cloud, and/or any other network. The data center 450 can include one or more computing devices remote to the local computing device 410 for managing a fleet of AVs and AV-related services. For example, in addition to managing the AV 402, the data center 450 may also support a ride-hailing service (e.g., a ridesharing service), a delivery service, a remote/roadside assistance service, street services (e.g., street mapping, street patrol, street cleaning, street metering, parking reservation, etc.), and the like.

Data center 450 can send and receive various signals to and from the AV 402 and the client computing device 470. These signals can include sensor data captured by the sensor systems 404-408, roadside assistance requests, software updates, ride-hailing/ridesharing pick-up and drop-off instructions, and so forth. In this example, the data center 450 includes a data management platform 452, an Artificial Intelligence/Machine Learning (AI/ML) platform 454, a simulation platform 456, a remote assistance platform 458, and a ride-hailing platform 460, and a map management platform 462, among other systems.

Data management platform 452 can be a "big data" system capable of receiving and transmitting data at high velocities (e.g., near real-time or real-time), processing a large variety of data and storing large volumes of data (e.g., terabytes, petabytes, or more of data). The varieties of data can include data having different structures (e.g., structured, semi-structured, unstructured, etc.), data of different types (e.g., sensor data, mechanical system data, ride-hailing service, map data, audio, video, etc.), data associated with different types of data stores (e.g., relational databases, key-value stores, document databases, graph databases, column-family databases, data analytic stores, search engine databases, time series databases, object stores, file systems, etc.), data originating from different sources (e.g., AVs, enterprise systems, social networks, etc.), data having different rates of change (e.g., batch, streaming, etc.), and/or data having other characteristics. The various platforms and systems of the data center 450 can access data stored by the data management platform 452 to provide their respective services.

The AI/ML platform 454 can provide the infrastructure for training and evaluating machine learning algorithms for operating the AV 402, the simulation platform 456, the remote assistance platform 458, the ride-hailing platform 460, the map management platform 462, and other platforms and systems. Using the AI/ML platform 454, data scientists can prepare data sets from the data management platform 452; select, design, and train machine learning models; evaluate, refine, and deploy the models; maintain, monitor, and retrain the models; and so on.

Simulation platform 456 can enable testing and validation of the algorithms, machine learning models, neural networks, and other development efforts for the AV 402, the remote assistance platform 458, the ride-hailing platform 460, the map management platform 462, and other platforms and systems. Simulation platform 456 can replicate a variety of driving environments and/or reproduce real-world scenarios from data captured by the AV 402, including rendering geospatial information and road infrastructure (e.g., streets, lanes, crosswalks, traffic lights, stop signs, etc.) obtained from a cartography platform (e.g., map management platform 462); modeling the behavior of other vehicles, bicycles, pedestrians, and other dynamic elements; simulating inclement weather conditions, different traffic scenarios; and so on.

Remote assistance platform 458 can generate and transmit instructions regarding the operation of the AV 402. For example, in response to an output of the AI/ML platform 454 or other system of the data center 450, the remote assistance platform 458 can prepare instructions for one or more stacks or other components of the AV 402.

Ride-hailing platform 460 can interact with a customer of a ride-hailing service via a ride-hailing application 472 executing on the client computing device 470. The client computing device 470 can be any type of computing system such as, for example and without limitation, a server, desktop computer, laptop computer, tablet computer, smartphone, smart wearable device (e.g., smartwatch, smart eyeglasses or other Head-Mounted Display (HMD), smart ear pods, or other smart in-ear, on-ear, or over-ear device, etc.), gaming system, or any other computing device for accessing the ride-hailing application 472. The client computing device 470 can be a customer's mobile computing device or a computing device integrated with the AV 402 (e.g., the local computing device 410). The ride-hailing platform 460 can receive requests to pick up or drop off from the ride-hailing application 472 and dispatch the AV 402 for the trip.

Map management platform 462 can provide a set of tools for the manipulation and management of geographic and spatial (geospatial) and related attribute data. The data management platform 452 can receive LIDAR point cloud data, image data (e.g., still image, video, etc.), RADAR data, GPS data, and other sensor data (e.g., raw data) from one or more AVs 402, Unmanned Aerial Vehicles (UAVs), satellites, third-party mapping services, and other sources of geospatially referenced data. The raw data can be processed, and map management platform 462 can render base representations (e.g., tiles (2D), bounding volumes (3D), etc.) of the AV geospatial data to enable users to view, query, label, edit, and otherwise interact with the data. Map management platform 462 can manage workflows and tasks for operating on the AV geospatial data. Map management platform 462 can control access to the AV geospatial data, including granting or limiting access to the AV geospatial data based on user-based, role-based, group-based, task-based, and other attribute-based access control mechanisms. Map management platform 462 can provide version control for the AV geospatial data, such as to track specific changes that (human or machine) map editors have made to the data and to revert changes when necessary. Map management platform 462 can administer release management of the AV geospatial data, including distributing suitable iterations of the data to different users, computing devices, AVs, and other consumers of HD maps. Map management platform 462 can provide analytics regarding the AV geospatial data and related data, such as to generate insights relating to the throughput and quality of mapping tasks.

In some embodiments, the map viewing services of map management platform 462 can be modularized and deployed as part of one or more of the platforms and systems of the data center 450. For example, the AI/ML platform 454 may incorporate the map viewing services for visualizing the effectiveness of various object detection or object classification models, the simulation platform 456 may incorporate the map viewing services for recreating and visualizing certain driving scenarios, the remote assistance platform 458 may incorporate the map viewing services for replaying traffic incidents to facilitate and coordinate aid, the ride-hailing platform 460 may incorporate the map viewing services into the client application 472 to enable passengers to view the AV 402 in transit en route to a pick-up or drop-off location, and so on.

While the autonomous vehicle 402, the local computing device 410, and the autonomous vehicle environment 400 are shown to include certain systems and components, one of ordinary skill will appreciate that the autonomous vehicle

402, the local computing device 410, and/or the autonomous vehicle environment 400 can include more or fewer systems and/or components than those shown in FIG. 4. For example, the autonomous vehicle 402 can include other services than those shown in FIG. 4 and the local computing device 410 can also include, in some instances, one or more memory devices (e.g., RAM, ROM, cache, and/or the like), one or more network interfaces (e.g., wired and/or wireless communications interfaces and the like), and/or other hardware or processing devices that are not shown in FIG. 4. An illustrative example of a computing device and hardware components that can be implemented with the local computing device 410 is described below with respect to FIG. 7.

Figure 5:
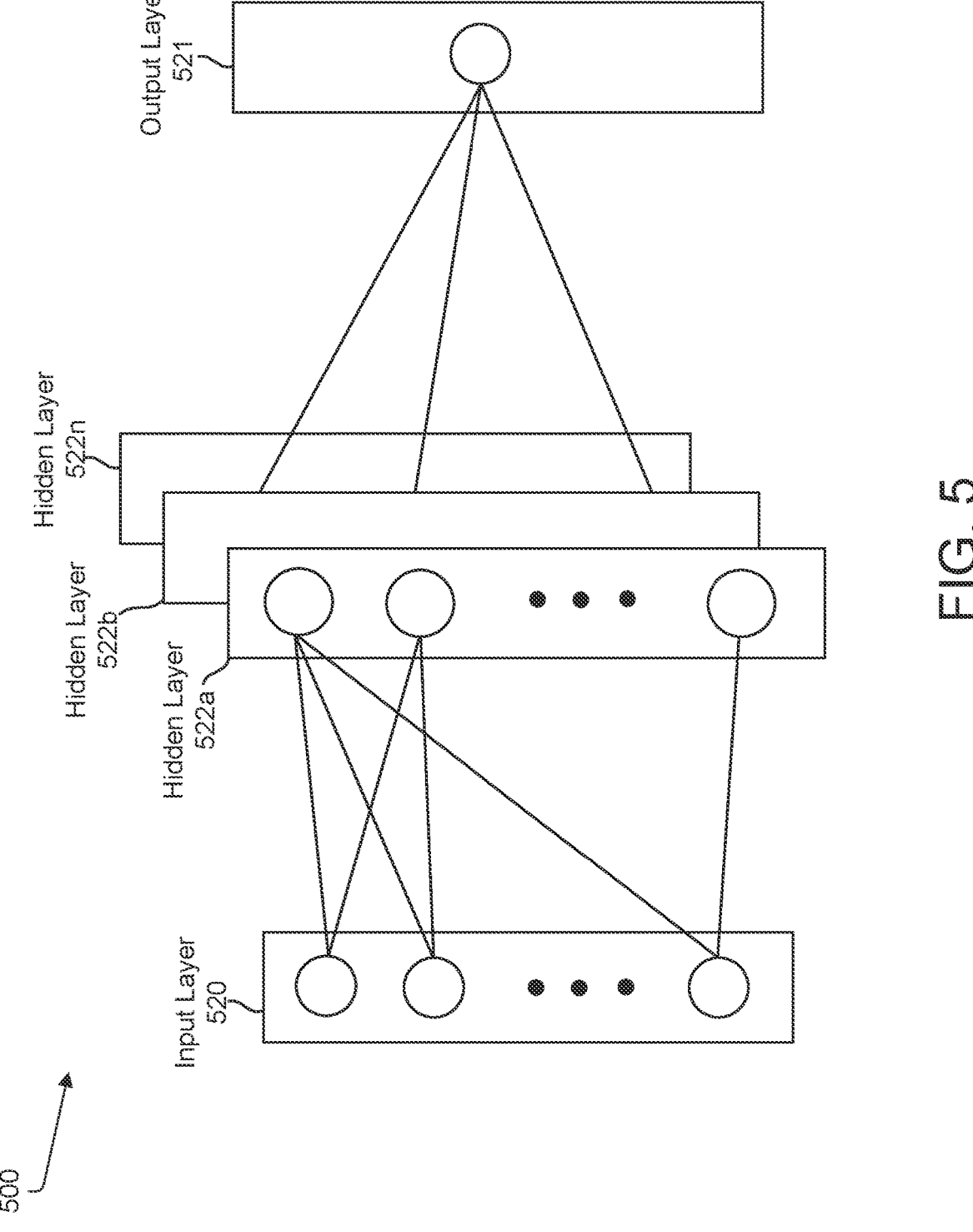
FIG. 5 illustrates an example of a deep learning neural network, according to some aspects of the disclosed technology.

In FIG. 5, the disclosure now turns to a further discussion of models that can be used through the environments and techniques described herein. FIG. 5 is an example of a deep learning neural network 500 that can be used to implement all or a portion of the systems and techniques described herein. An input layer 520 can be configured to receive sensor data and/or data relating to an environment surrounding an AV. Neural network 500 includes multiple hidden layers 522a, 522b, through 522n. The hidden layers 522a, 522b, through 522n include "n" number of hidden layers, where "n" is an integer greater than or equal to one. The number of hidden layers can be made to include as many layers as needed for the given application. Neural network 500 further includes an output layer 521 that provides an output resulting from the processing performed by the hidden layers 522a, 522b, through 522n.

Neural network 500 is a multi-layer neural network of interconnected nodes. Each node can represent a piece of information. Information associated with the nodes is shared among the different layers and each layer retains information as information is processed. In some cases, the neural network 500 can include a feed-forward network, in which case there are no feedback connections where outputs of the network are fed back into itself. In some cases, the neural network 500 can include a recurrent neural network, which can have loops that allow information to be carried across nodes while reading in input.

Information can be exchanged between nodes through node-to-node interconnections between the various layers. Nodes of the input layer 520 can activate a set of nodes in the first hidden layer 522a. For example, as shown, each of the input nodes of the input layer 520 is connected to each of the nodes of the first hidden layer 522a. The nodes of the first hidden layer 522a can transform the information of each input node by applying activation functions to the input node information. The information derived from the transformation can then be passed to and can activate the nodes of the next hidden layer 522b, which can perform their own designated functions. Example functions include convolutional, up-sampling, data transformation, and/or any other suitable functions. The output of the hidden layer 522b can then activate nodes of the next hidden layer, and so on. The output of the last hidden layer 522n can activate one or more nodes of the output layer 521, at which an output is provided. In some cases, while nodes in the neural network 500 are shown as having multiple output lines, a node can have a single output and all lines shown as being output from a node represent the same output value.

In some cases, each node or interconnection between nodes can have a weight that is a set of parameters derived from the training of the neural network 500. Once the neural network 500 is trained, it can be referred to as a trained neural network, which can be used to classify one or more activities. For example, an interconnection between nodes can represent a piece of information learned about the interconnected nodes. The interconnection can have a tunable numeric weight that can be tuned (e.g., based on a training dataset), allowing the neural network 500 to be adaptive to inputs and able to learn as more and more data is processed.

The neural network 500 is pre-trained to process the features from the data in the input layer 520 using the different hidden layers 522a, 522b, through 522n in order to provide the output through the output layer 521.

In some cases, the neural network 500 can adjust the weights of the nodes using a training process called backpropagation. A backpropagation process can include a forward pass, a loss function, a backward pass, and a weight update. The forward pass, loss function, backward pass, and parameter/weight update is performed for one training iteration. The process can be repeated for a certain number of iterations for each set of training data until the neural network 500 is trained well enough so that the weights of the layers are accurately tuned.

To perform training, a loss function can be used to analyze error in the output. Any suitable loss function definition can be used, such as a Cross-Entropy loss. Another example of a loss function includes the mean squared error (MSE), defined as $E\_total=\Sigma(\frac{1}{2} (target-output)^2)$. The loss can be set to be equal to the value of E_total.

The loss (or error) will be high for the initial training data since the actual values will be much different than the predicted output. The goal of training is to minimize the amount of loss so that the predicted output is the same as the training output. The neural network 500 can perform a backward pass by determining which inputs (weights) most contributed to the loss of the network, and can adjust the weights so that the loss decreases and is eventually minimized.

The neural network 500 can include any suitable deep network. One example includes a Convolutional Neural Network (CNN), which includes an input layer and an output layer, with multiple hidden layers between the input and out layers. The hidden layers of a CNN include a series of convolutional, nonlinear, pooling (for downsampling), and fully connected layers. The neural network 500 can include any other deep network other than a CNN, such as an autoencoder, Deep Belief Nets (DBNs), Recurrent Neural Networks (RNNs), among others.

As understood by those of skill in the art, machine-learning based classification techniques can vary depending on the desired implementation. For example, machine-learning classification schemes can utilize one or more of the following, alone or in combination: hidden Markov models; RNNs; CNNs; deep learning; Bayesian symbolic methods; Generative Adversarial Networks (GANs); support vector machines; image registration methods; and applicable rule-based systems. Where regression algorithms are used, they may include but are not limited to: a Stochastic Gradient Descent Regressor, a Passive Aggressive Regressor, etc.

Machine learning classification models can also be based on clustering algorithms (e.g., a Mini-batch K-means clustering algorithm), a recommendation algorithm (e.g., a Minwise Hashing algorithm, or Euclidean Locality-Sensitive Hashing (LSH) algorithm), and/or an anomaly detection algorithm, such as a local outlier factor. Additionally, machine-learning models can employ a dimensionality reduction approach, such as, one or more of: a Mini-batch Dictionary Learning algorithm, an incremental Principal Component Analysis (PCA) algorithm, a Latent Dirichlet Allocation algorithm, and/or a Mini-batch K-means algorithm, etc.

Figure 6:
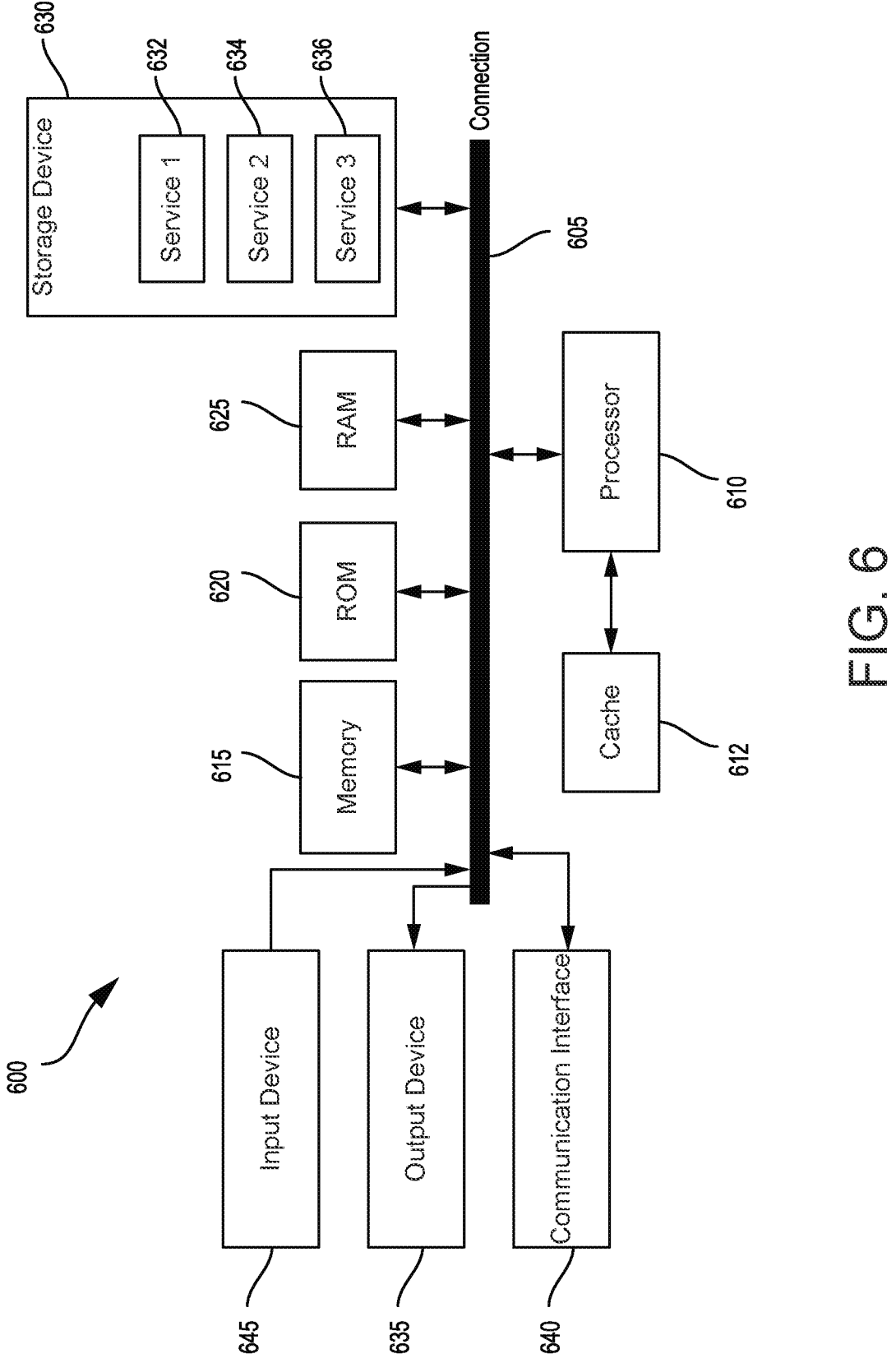
FIG. 6 illustrates an example processor-based system with which some aspects of the subject technology can be implemented.

FIG. 6 illustrates an example processor-based system with which some aspects of the subject technology can be implemented. For example, processor-based system 600 can be any computing device making up, or any component thereof in which the components of the system are in communication with each other using connection 605. Connection 605 can be a physical connection via a bus, or a direct connection into processor 610, such as in a chipset architecture. Connection 605 can also be a virtual connection, networked connection, or logical connection.

In some embodiments, computing system 600 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 600 includes at least one processing unit (Central Processing Unit (CPU) or processor) 610 and connection 605 that couples various system components including system memory 615, such as Read-Only Memory (ROM) 620 and Random-Access Memory (RAM) 625 to processor 610. Computing system 600 can include a cache of high-speed memory 612 connected directly with, in close proximity to, or integrated as part of processor 610.

Processor 610 can include any general-purpose processor and a hardware service or software service, such as services 632, 634, and 636 stored in storage device 630, configured to control processor 610 as well as a special-purpose processor where software instructions are incorporated into the actual processor design. Processor 610 may essentially be a completely self-contained computing system, containing multiple cores or processors, a bus, memory controller, cache, etc. A multi-core processor may be symmetric or asymmetric.

To enable user interaction, computing system 600 includes an input device 645, which can represent any number of input mechanisms, such as a microphone for speech, a touch-sensitive screen for gesture or graphical input, keyboard, mouse, motion input, speech, etc. Computing system 600 can also include output device 635, which can be one or more of a number of output mechanisms known to those of skill in the art. In some instances, multimodal systems can enable a user to provide multiple types of input/output to communicate with computing system 600. Computing system 600 can include communications interface 640, which can generally govern and manage the user input and system output. The communication interface may perform or facilitate receipt and/or transmission wired or wireless communications via wired and/or wireless transceivers, including those making use of an audio jack/plug, a microphone jack/plug, a Universal Serial Bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a Radio-Frequency Identification (RFID) wireless signal transfer, Near-Field Communications (NFC) wireless signal transfer, Dedicated Short Range Communication (DSRC) wireless signal transfer, 802.11 Wi-Fi® wireless signal transfer, Wireless Local Area Network (WLAN) signal transfer, Visible Light Communication (VLC) signal transfer, Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer signal transfer, ultraviolet light signal transfer, wireless signal transfer along the electromagnetic spectrum, or some combination thereof.

Communication interface 640 may also include one or more Global Navigation Satellite System (GNSS) receivers or transceivers that are used to determine a location of the computing system 600 based on receipt of one or more signals from one or more satellites associated with one or more GNSS systems. GNSS systems include, but are not limited to, the US-based Global Positioning System (GPS), the Russia-based Global Navigation Satellite System (GLO-NASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 630 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a Compact Disc (CD) Read Only Memory (CD-ROM) optical disc, a rewritable CD optical disc, a Digital Video Disk (DVD) optical disc, a Blu-ray Disc (BD) optical disc, a holographic optical disk, another optical medium, a Secure Digital (SD) card, a micro SD (microSD) card, a Memory Stick® card, a smartcard chip, a EMV chip, a Subscriber Identity Module (SIM) card, a mini/micro/nano/pico SIM card, another Integrated Circuit (IC) chip/card, Random-Access Memory (RAM), Atatic RAM (SRAM), Dynamic RAM (DRAM), Read-Only Memory (ROM), Programmable ROM (PROM), Erasable PROM (EPROM), Electrically Erasable PROM (EEPROM), flash EPROM (FLASHEPROM), cache memory (L1/L2/L3/L4/L5/L #), Resistive RAM (RRAM/ReRAM), Phase Change Memory (PCM), Spin Transfer Torque RAM (STT-RAM), another memory chip or cartridge, and/or a combination thereof.

Storage device 630 can include software services, servers, services, etc., that when the code that defines such software is executed by the processor 610, it causes the system 600 to perform a function. In some embodiments, a hardware service that performs a particular function can include the software component stored in a computer-readable medium in connection with the necessary hardware components, such as processor 610, connection 605, output device 635, etc., to carry out the function.

Embodiments within the scope of the present disclosure may also include tangible and/or non-transitory computer-readable storage media or devices for carrying or having computer-executable instructions or data structures stored thereon. Such tangible computer-readable storage devices can be any available device that can be accessed by a general purpose or special purpose computer, including the functional design of any special purpose processor as described above. By way of example, and not limitation, such tangible computer-readable devices can include RAM, ROM, EEPROM, CD-ROM or other optical disk storage, magnetic disk storage or other magnetic storage devices, or any other device which can be used to carry or store desired program code in the form of computer-executable instructions, data structures, or processor chip design. When information or instructions are provided via a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general-purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform tasks or implement abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other embodiments of the disclosure may be practiced in network computing environments with many types of computer system configurations, including personal computers, hand-held devices, multi-processor systems, microprocessor-based or programmable consumer electronics, network Personal Computers (PCs), minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

SELECTED EXAMPLES

Illustrative examples of the disclosure include:

Aspect 1. A computer-implemented method comprising: accessing labeled data of a data set that exists at a specific granularity level; sampling the labeled data on a lower granularity level relative to the specific granularity level of the data set to generate sampled data of the data set; labeling the sampled data of the data set to generate ground truth labeled data of the data set; comparing the labeled data to the ground truth labeled data to identify a labeling quality metric of the labeled data; and controlling relabeling of the data set based on the labeling quality metric.

Aspect 2. The computer-implemented method of Aspect 1, further comprising controlling relabeling of the data set based on the labeling quality metric further comprises relabeling the data set based on the labeling quality metric in relation to one or more thresholds.

Aspect 3. The computer-implemented method of any of Aspects 1 and 2, wherein the labeling quality metric is defined based on a specific application of the labeled data of the data set to one or more models.

Aspect 4. The computer-implemented method of any of Aspects 1 through 3, wherein the lower granularity level is an object level of granularity in the data set.

Aspect 5. The computer-implemented method of any of Aspects 1 through 4, wherein the sampled data of the data set is part of a first subset of the data set that is used in verifying the labeled data and relabeling the data set further comprises: sampling the data set to generate a second subset of the data set; and labeling the second subset of the data set to generate refined labeled data of the data set.

Aspect 6. The computer-implemented method of any of Aspects 1 through 5, wherein the second subset of the data set is generated independently from the first subset of the data set.

Aspect 7. The computer-implemented method of any of Aspects 1 through 6, further comprising applying one or more machine learning techniques to select an amount to sample the data set to generate a specific size of the second subset of the data set.

Aspect 8. The computer-implemented method of any of Aspects 1 through 7, further comprising applying one or more machine learning techniques to identify specific portions of the data set to include in the second subset of the data based on a likelihood that the specific portions of the data set are labeled incorrectly.

Aspect 9. The computer-implemented method of any of Aspects 1 through 8, further comprising: comparing the refined labeled data to the ground truth labeled data to identify a labeling quality metric of the refined labeled data; and controlling further relabeling of the data set based on the labeling quality metric of the refined labeled data.

Aspect 10. A system comprising: one or more processors; and at least one computer-readable storage medium having stored therein instructions which, when executed by the one or more processors, cause the one or more processors to: access labeled data of a data set that exists at a specific granularity level; sample the labeled data on a lower granularity level relative to the specific granularity level of the data set to generate sampled data of the data set; label the sampled data of the data set to generate ground truth labeled data of the data set; compare the labeled data to the ground truth labeled data to identify a labeling quality metric of the labeled data; and control relabeling of the data set based on the labeling quality metric.

Aspect 11. The system of Aspect 10, wherein the instructions further cause the one or more processors to relabel the data set based on the labeling quality metric in relation to one or more thresholds.

Aspect 12. The system of any of Aspects 10 and 11, wherein the labeling quality metric is defined based on a specific application of the labeled data of the data set to one or more models.

Aspect 13. The system of any of Aspects 10 through 12, wherein the lower granularity level is an object level of granularity in the data set.

Aspect 14. The system of any of Aspects 10 through 13, wherein the sampled data of the data set is part of a first subset of the data set that is used in verifying the labeled data and the instructions further cause the one or more processors to: sample the data set to generate a second subset of the data set; and label the second subset of the data set to generate refined labeled data of the data set.

Aspect 15. The system of any of Aspects 10 through 14, wherein the second subset of the data set is generated independently from the first subset of the data set.

Aspect 16. The system of any of Aspects 10 through 15, wherein the instructions further cause the one or more processors to apply one or more machine learning techniques to select an amount to sample the data set to generate a specific size of the second subset of the data set.

Aspect 17. The system of any of Aspects 10 through 16, wherein the instructions further cause the one or more processors to apply one or more machine learning techniques to identify specific portions of the data set to include in the second subset of the data based on a likelihood that the specific portions of the data set are labeled incorrectly.

Aspect 18. The system of any of Aspects 10 through 17, wherein the instructions further cause the one or more processors to: compare the refined labeled data to the ground truth labeled data to identify a labeling quality metric of the refined labeled data; and control further relabeling of the data set based on the labeling quality metric of the refined labeled data.

Aspect 19. A non-transitory computer-readable storage medium storing instructions for causing one or more processors to: access labeled data of a data set that exists at a specific granularity level; sample the labeled data on a lower granularity level relative to the specific granularity level of the data set to generate sampled data of the data set; label the sampled data of the data set to generate ground truth labeled data of the data set; compare the labeled data to the ground truth labeled data to identify a labeling quality metric of the labeled data; and control relabeling of the data set based on the labeling quality metric.

Aspect 20. The non-transitory computer-readable storage medium of Aspect 19, wherein the sampled data of the data set is part of a first subset of the data set that is used in verifying the labeled data and the instructions further cause the one or more processors to: sample the data set to generate a second subset of the data set; and label the second subset of the data set to generate refined labeled data of the data set.

Aspect 21. A system comprising means for performing a method according to any of Aspects 1 through 9.

The various embodiments described above are provided by way of illustration only and should not be construed to limit the scope of the disclosure. For example, the principles herein apply equally to optimization as well as general improvements. Various modifications and changes may be made to the principles described herein without following the example embodiments and applications illustrated and described herein, and without departing from the spirit and scope of the disclosure.

Claim language or other language in the disclosure reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

What is claimed is:

1. A computer-implemented method, comprising:
accessing labeled data of a data set that exists at a capture granularity level, wherein the capture granularity level includes data captured by a plurality of sensors within a temporal time frame;
sampling the labeled data at a lower granularity level relative to the capture granularity level of the data set to generate sampled data of the data set;
labeling the sampled data to generate ground truth labeled data;
comparing the labeled data to the ground truth labeled data to determine a labeling quality metric of labels of the labeled data representing an accuracy of the labels of the labeled data based on a number of labels within a predefined error tolerance;
determining that the labeling quality metric satisfies a criterion;
based on determining that the labeling quality metric satisfies the criterion:
    determining a sampling percentage for relabeling based on a difference between the labeling quality metric and a target quality metric;
    relabeling a portion of the labeled data based on the labeling quality metric and the sampling percentage; and
    training a machine learning model based on the relabeled portion of the labeled data; and
deploying the trained machine learning model to an autonomous vehicle, the trained machine learning model, when deployed to the autonomous vehicle, is configured to:
    execute the trained machine learning model in a control stack for making predictions based on input data;
    generate commands for actuators of the autonomous vehicle, the actuators including at least one of a steering system, a braking system, or a propulsion system; and
    navigate the autonomous vehicle based on the commands.

2. The computer-implemented method of claim 1, wherein relabeling the portion of the labeled data based on the labeling quality metric and the sampling percentage comprises relabeling the labeled data based on the labeling quality metric in relation to one or more thresholds.

3. The computer-implemented method of claim 1, wherein relabeling the portion of the labeled data based on the labeling quality metric and the sampling percentage comprises relabeling the labeled data based on a labeling quality metric defined based on a specific application of the labeled data to one or more models.

4. The computer-implemented method of claim 1, wherein the lower granularity level is an object level of granularity in the data set.

5. The computer-implemented method of claim 1, wherein the sampled data is part of a first subset of the labeled data that is used in verifying the labels of the labeled data, and wherein relabeling the labeled data comprises:
    sampling the labeled data to generate a second subset of the data set; and
    labeling the second subset of the data set to generate refined labeled data of the data set.

6. The computer-implemented method of claim 5, wherein the second subset of the data set is generated independently from the first subset of the data set.

7. The computer-implemented method of claim 5, further comprising applying one or more machine learning techniques to select an amount of the data set to sample to generate a specific size of the second subset of the data set.

8. The computer-implemented method of claim 5, further comprising applying one or more machine learning techniques to identify specific portions of the data set to include in the second subset of the data based on a likelihood that the specific portions of the data set are labeled incorrectly.

9. The computer-implemented method of claim 5, further comprising:
    comparing the refined labeled data to the ground truth labeled data to identify a labeling quality metric of the refined labeled data; and
    relabeling the refined labeled data based on the labeling quality metric of the refined labeled data.

10. A system, comprising:
one or more processors; and
at least one computer-readable storage medium storing instructions which, when executed by the one or more processors, cause the one or more processors to:
    access labeled data of a data set that exists at a capture granularity level, wherein the capture granularity level includes data captured by a plurality of sensors within a temporal time frame;
    sample the labeled data at a lower granularity level relative to the capture granularity level of the data set to generate sampled data of the data set;
    label the sampled data to generate ground truth labeled data;
    compare the labeled data to the ground truth labeled data to determine a labeling quality metric of labels of the labeled data representing an accuracy of the labels of the labeled data based on a number of labels within a predefined error tolerance;
    determine that the labeling quality metric satisfies a criterion;
    based on determining that the labeling quality metric satisfies the criterion:
        determine a sampling percentage for relabeling based on a difference between the labeling quality metric and a target quality metric;
        relabel a portion of the labeled data based on the labeling quality metric and the sampling percentage; and
        train a machine learning model based on the relabeled portion of the labeled data; and
    deploy the trained machine learning model to an autonomous vehicle, the trained machine learning model, when deployed to the autonomous vehicle, is configured to:
        execute the trained machine learning model in a control stack for making predictions based on input data;
        generate commands for actuators of the autonomous vehicle, the actuators including at least one of a steering system, a braking system, or a propulsion system; and
        navigate the autonomous vehicle based on the commands.

11. The system of claim 10, wherein the instructions further cause the one or more processors to relabel the portion of the labeled data set based on the labeling quality metric and the sampling percentage comprises relabeling the labeled data based on the labeling quality metric in relation to one or more thresholds.

12. The system of claim 10, wherein the labeling quality metric is defined based on a specific application of the labeled data to one or more models.

13. The system of claim 10, wherein the lower granularity level is an object level of granularity in the data set.

14. The system of claim 10, wherein the sampled data is part of a first subset of the labeled data that is used in verifying the labels of the labeled data, and wherein the instructions further cause the one or more processors to:

sample the labeled data to generate a second subset of the data set; and label the second subset of the data set to generate refined labeled data of the data set.

15. The system of claim 14, wherein the second subset of the data set is generated independently from the first subset of the data set.

16. The system of claim 14, wherein the instructions further cause the one or more processors to apply one or more machine learning techniques to select an amount to sample the data set to generate a specific size of the second subset of the data set.

17. The system of claim 14, wherein the instructions further cause the one or more processors to apply one or more machine learning techniques to identify specific portions of the data set to include in the second subset of the data based on a likelihood that the specific portions of the data set are labeled incorrectly.

18. The system of claim 14, wherein the instructions further cause the one or more processors to:

compare the refined labeled data to the ground truth labeled data to identify a labeling quality metric of the refined labeled data; and relabel the refined labeled data based on the labeling quality metric of the refined labeled data.

19. A non-transitory computer-readable storage medium storing instructions for causing one or more processors to:

access labeled data of a data set that exists at a capture granularity level, wherein the capture granularity level includes data captured by a plurality of sensors within a temporal time frame;

sample the labeled data at a lower granularity level relative to the capture granularity level of the data set to generate sampled data of the data set;

label the sampled data to generate ground truth labeled data;

compare the labeled data to the ground truth labeled data to determine a labeling quality metric of labels of the labeled data representing an accuracy of the labels of the labeled data based on a number of labels within a predefined error tolerance;

determine that the labeling quality metric satisfies a criterion;

based on determining that the labeling quality metric satisfies the criterion:

determine a sampling percentage for relabeling based on a difference between the labeling quality metric and a target quality metric;

relabel a portion of the labeled data based on the labeling quality metric and the sampling percentage; and train a machine learning model based on the relabeled portion of the labeled data; and deploy the trained machine learning model to an autonomous vehicle, the trained machine learning model, when deployed to the autonomous vehicle, is configured to:

execute the trained machine learning model in a control stack for making predictions based on input data;

generate commands for actuators of the autonomous vehicle, the actuators including at least one of a steering system, a braking system, or a propulsion system; and navigate the autonomous vehicle based on the commands.

20. The non-transitory computer-readable storage medium of claim 19, wherein the sampled data is part of a first subset of the labeled data that is used in verifying the labels of the labeled data, and wherein the instructions further cause the one or more processors to:

sample the labeled data set to generate a second subset of the data set; and label the second subset of the data set to generate refined labeled data of the data set.

\*   \*   \*   \*   \*